United States Patent [19]

Manabe et al.

[11] 4,194,411

[45] Mar. 25, 1980

[54] STEERING COLUMN SUPPORT ASSEMBLY

[75] Inventors: Shigeru Manabe, Kashihara; Shuzo Hirakushi, Yao, both of Japan

[73] Assignee: Koyo Seiko Company Limited, Osaka, Japan

[21] Appl. No.: 893,323

[22] Filed: Mar. 31, 1978

[30] Foreign Application Priority Data

Apr. 6, 1977 [JP] Japan .................................. 52-39716
Feb. 6, 1978 [JP] Japan .................................. 53-13150

[51] Int. Cl.² ............................................... B62D 1/18
[52] U.S. Cl. ....................................... 74/492; 188/1 C
[58] Field of Search .................. 74/492, 493; 188/1 C

[56] References Cited

U.S. PATENT DOCUMENTS

| | | | |
|---|---|---|---|
| 3,597,994 | 8/1971 | Shiomi et al. | 74/492 |
| 3,612,223 | 10/1971 | Shiomi | 74/492 X |
| 3,621,732 | 11/1971 | Kaniut | 74/492 |
| 3,911,759 | 10/1975 | Tanaka et al. | 74/492 |
| 4,117,741 | 10/1978 | Yazane | 74/492 |

*Primary Examiner*—Allan D. Herrmann
*Attorney, Agent, or Firm*—Mason, Fenwick & Lawrence

[57] ABSTRACT

A support member joined to a steering column to hold the column from below has planar opposite side portions formed in their rear ends closer to the steering handle with elongated grooves for passing bolts for anchoring the support member to the vehicle body. A frame-shaped energy absorbing member having a deformation promoting aperture punched therein to form zigzag substantial portions in parallel to the axis of the column is provided between the support member and the vehicle body. The absorbing member is partially formed with weak portions and is secured at its front end to the front portion of the support member and anchored to the vehicle body by the bolts. When the absorbing member is subjected to load less than a specified value and acting axially of the column upon the displacement of the support member toward the steering gear in the event of collision of the vehicle, the absorbing member undergoes plastic deformation, while if the load is greater, the absorbing member is breakable at the weak portions. The absorbing member has curved projections producing a saturated spring action on the support member and on the vehicle body against the axial fastening force of the bolts, permitting the friction between the support member and the absorbing member also to absorb the energy of collision.

14 Claims, 15 Drawing Figures

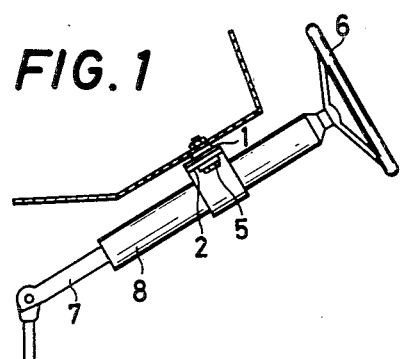
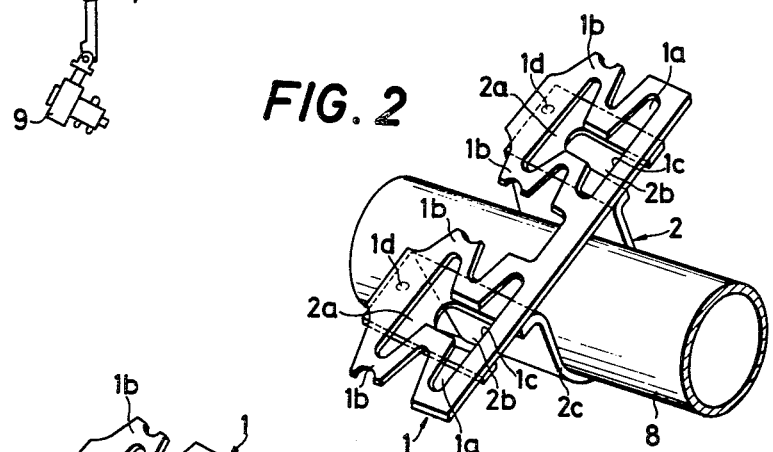
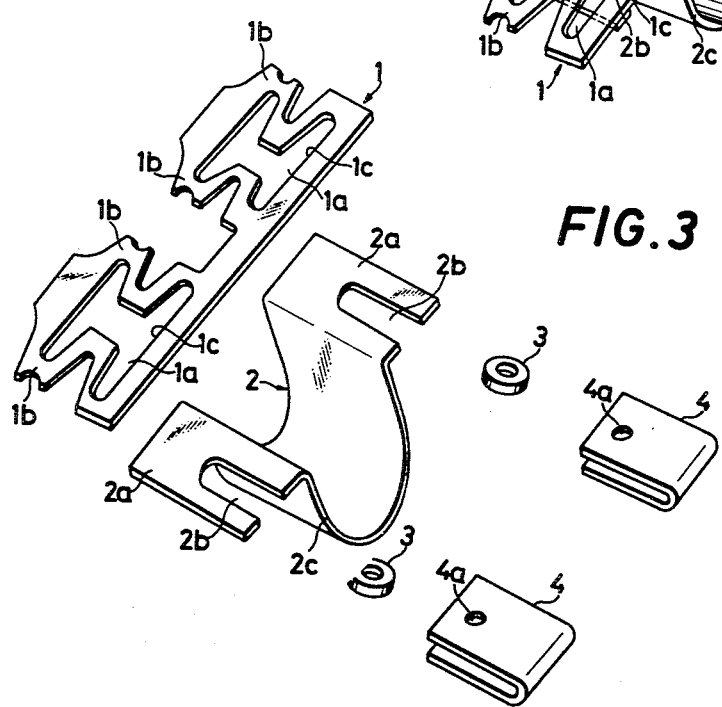

STEERING COLUMN SUPPORT ASSEMBLY

BACKGROUND OF THE INVENTION

This invention relates to a steering column support assembly having an energy absorbing function as means for protecting the driver in the event of a collision of motor vehicles.

Steering assemblies capable of absorbing energy in collisions heretofore known include those incorporating a bellows tube which is adapted to be compressed by the steering shaft for the absorption of energy by the resistance involved (U.S. Pat. No. 3,621,732). Also known are those in which the steering column support bracket for securing the steering column to the vehicle body with bolts is rendered movable in only one direction (Japanese Patent Application Disclosure No. 70336/1974 and Japanese Patent Publication No. 1413/1974).

However, the conventional devices are composed of a larger number of parts and are therefore complex to assemble, require a number of assembling steps and are much more expensive than usual steering assemblies which are not adapted for the absorption of energy in the event of a collision. The conventional devices further have the drawback that the energy absorbing member involves variations in the mode of undergoing plastic deformation due to variations in the quality of the material and the configuration of the member, failing to assure the shock absorption contemplated for the protection of the driver whereas the absorbing member is designed to effect progressive absorption of energy in the initial stage of collision.

SUMMARY OF THE INVENTION

An object of this invention is to overcome the above drawbacks and to provide a novel steering column support assembly in which only the bracket portion for supporting the steering column is adapted for the absorption of energy in the event of a collision.

Another object of this invention is to provide a steering column support assembly comprising an energy absorbing member which can be manufactured easily and inexpensively as by blanking, the support assembly being composed of a greatly reduced number of parts and having a simple construction but possessing an ability to absorb energy in a stepwise fashion.

Another object of this invention is to provide a steering column support assembly comprising an energy absorbing member having various characteristics such that the absorbing member will be subjected to a progressively increasing load in the event of a collision for the progressive absorption of the resulting energy to thereby ensure greatly enhanced safety.

Still another object of this invention is to provide a steering column support assembly comprising an energy absorbing member formed with curved projections, the curved projections having saturated spring characteristics against the axial force of the bolts fastening the support assembly to the vehicle body so as to permit the assembly to retain the desired static frictional resistance in the initial stage of deformation, the curved projections further serving to accommodate variations in the thickness of the energy absorbing member as well as in the thickness of the support member therefor to eliminate the necessity of matching the dimensions of the constituent parts when fabricating the assembly and to thereby impart stable properties to the resulting assembly and reduce the number of steps needed for the manufacture of the present assembly.

The energy absorbing member of this invention includes zigzag portions having a sufficient curvature, so that the absorbing member, despite its compactness, involves a sufficient deformation stroke free of stress concentration and therefore functions with improved stability, while being capable of absorbing the vibrations delivered to the steering column to thereby render the steering wheel almost free of any vibration during the usual driving operation.

BRIEF DESCRIPTION OF THE DRAWINGS

FIG. 1 is a schematic side elevation showing a steering column support assembly according to this invention;

FIG. 2 is a perspective view showing an energy absorbing member and a support member of this invention as joined to a steering column;

FIG. 3 is an exploded perspective view showing the assembly of this invention;

DESCRIPTION OF THE PREFERRED EMBODIMENTS

Figure 4:
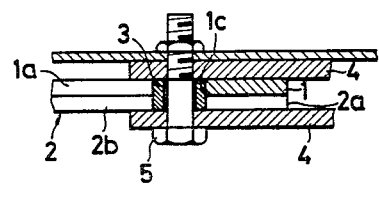
FIG. 4 is a fragmentary elevation showing the assembly as it is mounted on the vehicle body.

This invention will be described below in greater detail with reference to the accompanying drawings showing embodiments.

FIG. 1 is a side elevation schematically showing an energy absorbing steering assembly according to this invention. A steering shaft 7 (to be hereinafter referred to briefly as the "shaft") has an upper end carrying a steering wheel 6 (to be hereinafter referred to briefly as the "wheel") and a lower end connected to a steering gear mechanism 9 (to be hereinafter referred to briefly as the "gear"). The shaft 7 is fitted in a steering column 8 (to be hereinafter referred to briefly as the "column") and is rotatable but not movable axially of the shaft 7 or column 8. As already known, the shaft 7 may be composed of longitudinally divided two segments which are movable relative to each other.

The column 8 is joined to the support member 2 to be described later as by welding or bolts (not shown) and is installed on the vehicle body with the support member 2 anchored to the body by bolts 5. The term "vehicle body" herein used means the dashboard portion in the driver's compartment of the motor vehicle.

The energy absorbing member 1 of this invention is characterized in that a deformation promoting aperture 1a is punched in its inner portion to form zigzag substantial portions in parallel to the axial direction of the column, so that when absorbing energy, namely when subjected to tension axially of the column, the absorbing member 1 will undergo bending elastic deformation.

With reference to FIGS. 1 and 2, the energy absorbing frame-shaped member 1 formed with the above-mentioned deformation promoting apertures 1a has at its one end inner edges 1c supported by bolts 5 for fastening the member to the vehicle body. The other end portions 1d to be positioned closer to the gear side of the column 8 are fixedly joined to the front portion of a support member 2 for immovably holding the column 8. Although the bolts 5 are not shown in FIG. 2 which is a perspective view of the energy absorbing member 1 and the support member 2, the bolts 5 are passed through elongated bolt grooves 2b formed in the planar portions of the support member 2 and through the apertures 1a to support the inner edges 1c and are fastened to the vehicle body by nuts.

Figure 9:
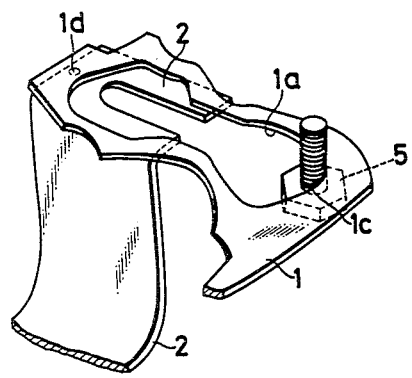
FIG. 9 is a perspective view illustrating how the absorbing member of this invention functions.

When the column 8 is subjected to a load acting in an upwardly leftward direction in FIG. 2, the support member 2 is moved leftward with the column 8. At this time, the energy absorbing member 1 welded at its front end to the support member 2 as shown in FIG. 9 is subjected to a tension acting between the anchor bolts 5 fastened to the vehicle body and the support member 2 which is forced leftward by impact, whereby the energy absorbing member 1 as held by the bolts 5 is stretched leftward, thus undergoing plastic deformation first with its zigzag substantial portions stretched, and thereafter undergoing plastic deformation to thereby absorb the energy.

FIG. 3 is an exploded perspective view showing the assembly of FIG. 2. The support member 2 is in the form of a steel plate of U-shaped cross section and has on its opposite sides planar portions 2a each formed with an elongated bolt groove 2b. The groove 2b has a width greater than the outside diameter of the bolt 5 and extends in parallel to the column 8. As illustrated, the bolt grooves 2b are opened toward the upper end of the column 8, namely toward the wheel carrying end of the shaft 7, so that the open ends of the grooves 2b are positioned at the upper end of the support member 2. The support member 2 has a central bent portion 2c which is so dimensioned as to embrace about one half of the periphery of the column 8.

The energy absorbing member 1 is made from a planar steel plate by blanking and formed with the deformation promoting apertures 1a in the portions to be superposed on the opposite planar portions 2a of the support member 2. The deformation promoting apertures 1a shown in FIGS. 2 and 3 are substantially H-shaped, and the portions of each aperture 1a corresponding to the vertical parallel bars of the letter H extend at right angles to the axis of the column 8. The outer peripheral portion of the absorbing member 1 defining the aperture 1a is zigzag and similar to the aperture 1a in configuration. The portions of the outer peripheral part of the member 1 which portions define the opposite side ends of one portion of the aperture 1a closer to the gear 9 may be formed with weak portions 1b having a smaller width than the other part of the member 1. Alternatively, the weak portions 1b may be proveded on the opposite side ends of another portion of the aperture 1a closer to the wheel 6. The necessity of providing the weak portions will become apparent from the description to follow.

The portion of the deformation promoting aperture 1a corresponding to the horizontal bar of the letter H has the same width as the bolt groove 2b. The energy absorbing member 1 is placed over the support member 2 with the portions of the former corresponding to the horizontal bar of the letter H in register with the bolt grooves 2b, and the superposed end portions of the members 1 and 2 positioned closer to the gear 9 are joined together as by spot welding to secure the member 1 to the member 2.

Because of the above-mentioned configuration and the properties of its material, the energy absorbing member 1, when subjected to a load acting in the direction to enlarge the aperture 1a axially of the column 8, will be stretched in that direction through plastic deformation. If the energy absorbing member 1 is of the type suited to a very heavy load, the weak portions 1b may be adapted to be ruptured when so loaded.

Annular seat members 3 for the bolts 5 for supporting the energy absorbing member 1 have a thickness equal to the combined thickness of the superposed absorbing member 1 and support member 2, an outside diameter slightly smaller than the width of the bolt grooves 2b and an inside diameter permitting the bolt 5 to pass therethrough. Synthetic resin or metal spacers 4 are in the form of a flat U-shape in section, and the upper and lower plate portions thereof are bored as at 4a for passing the bolt 5 therethrough.

Figure 5:
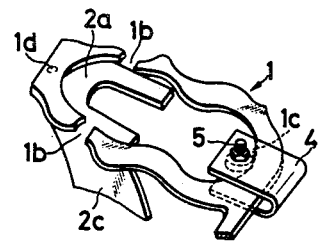
FIG. 5 is a perspective view showing an energy absorbing member as it has been ruptured.

The support member 2 and the energy absorbing member 1 joined to the column 8 are attached to the vehicle body with use of two anchor bolts 5, two annular seat members 3 and two spacers 4 as shown in FIGS. 1 and 4. Stated more specifically, the seat members 3 are placed in the bolt grooves 2b of the support member 2 and in the deformation promoting apertures 1a, with the outer periphery thereof partially in contact with the inner edges 1c of the energy absorbing member 1 positioned closer to the wheel 6. The spacers 4 are fitted over the members 1 and 2 from one end of the assembly closer to the wheel 6, with the bores of the seat members 3 in register with the corresponding bores of the spacers 4 as seen in FIG. 5. The anchor bolts 5 are passed through these bores and then through the holes formed in the specified location of the dashboard portion of the vehicle body, and nuts are serewed on the bolts 5 to mount the resulting assembly in position.

The energy absorbing means of this invention having the foregoing construction and mounted on the vehicle body will operate as follows when the driver is forced against the wheel 6 upon collision of his vehicle. The force of impact resulting from the secondary collision of the driver against the wheel 6 is delivered from the wheel 6 through the shaft 7 to the column 8, which in turn tends to move toward the gear 9 with the support member 2. However, since the inner edges 1c of the energy absorging member 1 positioned on the wheel side 6 and defining the apertures 1a are in contact with the annular seat members 3 whose position relative to the vehicle body is fixed by the bolts 5, the energy absorbing member 1 will be subjected to a load acting toward the gear 9, namely toward the direction to enlarge the apertures 1a axially of the column 8.

Accordingly, the energy absorbing member 1 undergoes bending elastic deformation first, then bending plastic deformation and subsequently tensile plastic deformation. During the process of such plastic deformation, the energy of impact given by the driver will be absorbed by the absorbing member 1. With absorbing members 1 adapted to absorb the energy of excessively high impact, the limit below which the energy absorbing member 1 is plastically deformable will be exceeded if the load thereon is greater than is specified, with the result that the energy absorbing member 1 will be broken at the weak portions 1b as seen in FIG. 5. The rupture thus taking place prevents the generation of an excess reaction force while absorbing the remaining energy. The spacers 4, while enabling the fastened anchor bolts 5 to reliably secure the column 8 to the vehicle body, give a suitable amount of slippage to the energy absorbing member 1 and the vehicle body portion which are in contact therewith, thus acting to facilitate the deformation of the absorbing member 1.

Through the process of bending elastic deformation through plastic deformation described, the assembly of this invention absorbs the energy of secondary collision of the driver against the wheel 6 resulting from the collision of the motor vehicle. Since the assembly is composed of two members of simple construction and is mountable with simple parts, the energy of collision is absorbable with use of a reduced number of parts which can be manufactured with ease and assembled by a reduced number of steps. Thus the energy absorbing steering assembly of this invention can be provided at a low cost.

Figure 6:
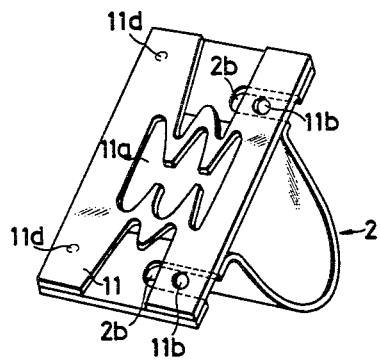
FIGS. 6 to 8 are perspective views showing other embodiments of this invention respectively.

FIG. 6 shows another embodiment of this invention in which an energy absorbing member 11 is formed with a single deformation promoting aperture 11a in its center and with independent bolt holes 11b positioned in corresponding relation to the bolt grooves 2b of the support member 2. The member 11 is welded to the support member 2 at portions indicated at 11d.

Figure 7:
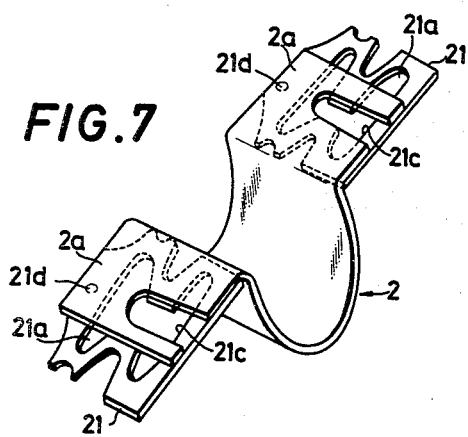

FIG. 7 shows another embodiment of this invention which comprises two separate energy absorbing members 21 which are positioned beneath the planar portions 2a of the support member 2 on the opposite sides thereof and secured thereto as at 21d.

Figure 8:
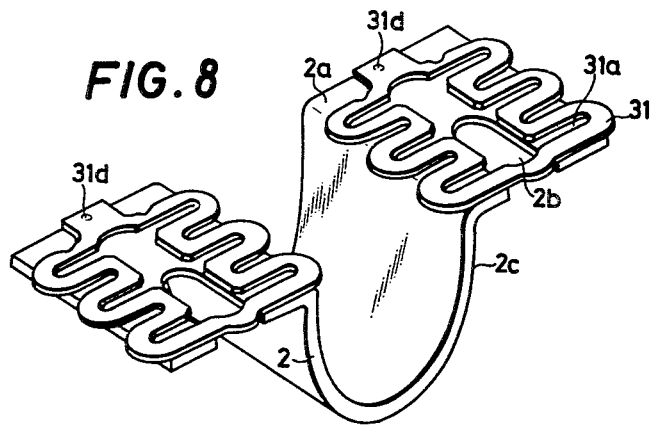

FIG. 8 shows another embodiment comprising an energy absorbing member 31 having a deformation promoting aperture 31a which includes a plurality of symmetrical zigzag portions. The member 31 is secured as at 31d to the upper surface of the planar portion 2a of the support member 2.

The assemblies shown in FIGS. 6 to 8 are anchored to the vehicle body in the same manner as in the first embodiment, operate similarly and have comparable advantages. The deformation promoting aperture can be designed as desired, while a plurality of such apertures may be provided. By suitably designing the shape of the aperture and determining the cross section of the zigzag substantial portions of the absorbing member, the indefinite factors involved in the function of the known absorbing devices can be eliminated.

Figure 10:
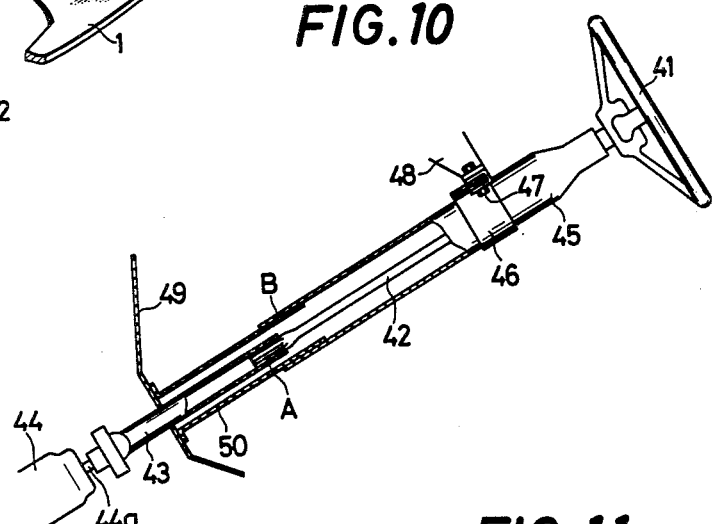
FIG. 10 is a view partly in longitudinal section and schematically showing the construction of a steering device for which another embodiment of this invention is installed.

FIGS. 11 to 15 show another embodiment of this invention for use with the steering device shown in FIG. 10. With reference to FIG. 10, a steering shaft comprises two portions, i.e. an upper shaft portion 42 connected to a steering wheel 41 and a lower shaft portion 43 connected to the input shaft 44a of a steering gear mechanism 44. The two shaft portions are joined together at A as by splining as already known for the transmission of torque. The shaft portions are axially slidable relative to each other.

A steering column 45 rotatably supporting the shaft portions 42 and 43 are attached by a support member 46 and bolts to a lower portion of the dashboard of a vehicle body 48. The column 45 is also supported at its lower end by a tubular member 50 on a fire resistant wall 49 of the vehicle frame. The column 45 and the tubular member 50 are axially slidable relative to each other at the junction B therebetween.

Figure 11:
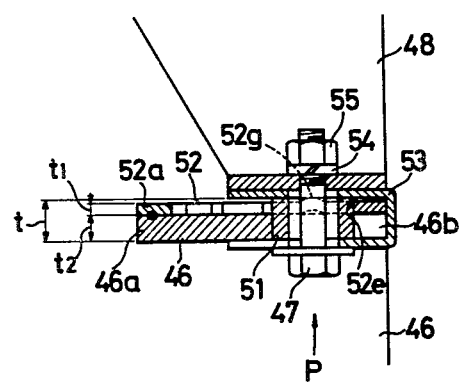
FIG. 11 is a view in vertical section showing the same embodiment.
Figure 12:
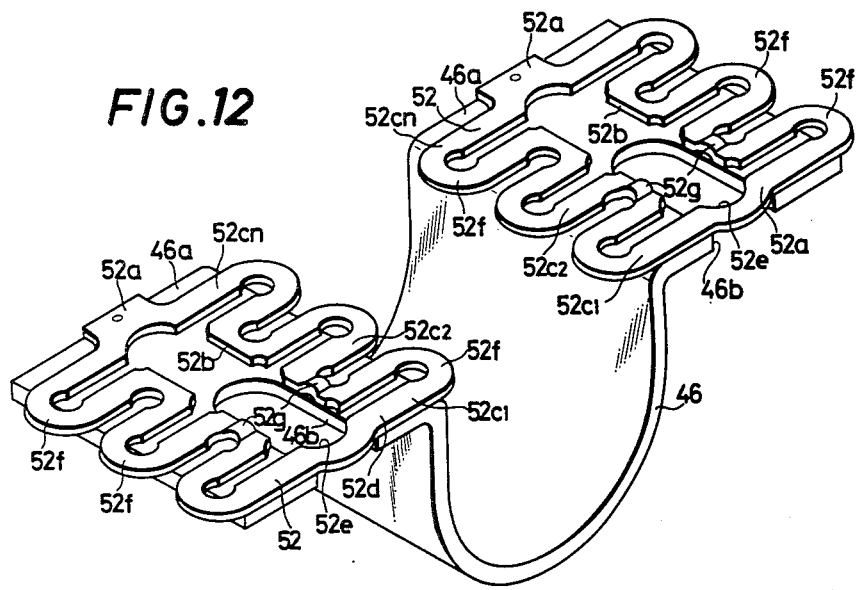
FIG. 12 is a perspective view showing the principal parts of the same embodiment.
Figure 13:
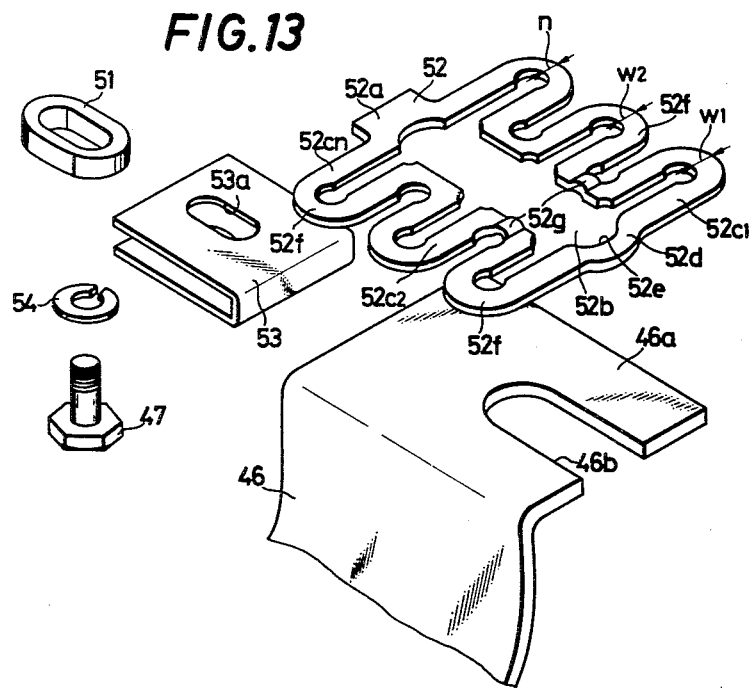
FIG. 13 is an exploded perspective view showing the same embodiment.
Figure 14:
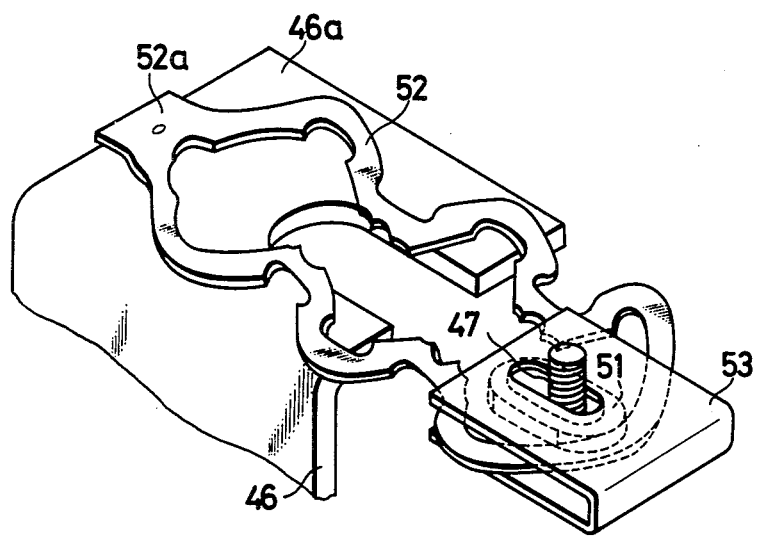
FIG. 14 is a perspective view showing how the embodiment functions.

With reference to FIGS. 11 to 13, the support member 46 is U-shaped in conformity with the outer periphery of the column 45 and includes horizontal planar portions 46a laterally extending from the upper edges of the U-shaped portion. The U-shaped bent portion of the support member 46 is fixedly joined to the steering column 45 as by welding or some other suitable means as in the foregoing embodiments. Each of the planar portions 46a has a groove 46b opened at its one edge on the wheel side and extending in parallel to the axis of the steering shaft. The groove 46b has a sufficient width for fitting therein an annular seat member 51 for the bolt 47. With the present assembly secured to the vehicle body 48 as specified with use of the bolts 47 and annular seat members 51, the support member 46 is prevented from displacement toward the wheel 41 but is movable toward the steering gear mechanism 44.

The energy absorbing member comprises a pair of pieces 52 which are superposed on the planar portions 46a. One end 52a of the absorbing piece 52 on the gear side 44 is secured to the planar portion 46a.

The energy absorbing piece 52 has an elongated aperture 52b extending in the axial direction of the steering shaft for fitting the annular seat member 51 therein. On the opposite sides of the aperture 52b, the piece 52 has continuous zigzag portions $52c_1, 52c_2, \ldots 52c_n$ including a plurality of bent portions 52f. On the other end 52d of the absorbing piece 52 opposite to the end 52a secured to the planar portion 46a and positioned closer to the wheel 41, the absorbing piece 52 has a recess 52e for anchoring the annular seat member 51. The bent portions 52f of the zigzag portions $52c_1, 52c_2, \ldots 52c_n$ are in the form of a circular arc having a sufficent curvature so as to be fully deformable during the deformation of the absorbing member free of any stress concentration which would break the portion 52f. Further to enable the absorbing member to absorb energy most favorably during deformation, the zigzag portions $52c_1, 52c_2, \ldots 52c_n$ and the bent portions 52f have progressively decreasing widths w1, w2, ... wn toward its fixed end 52a, namely w1 > w2 > ... > wn.

A spacer 53 having bores 53a in its upper and lower portions for passing the bolt 47 therethrough holds the annular seat member 51, part of the planar portion 46a defining the groove 46b and part of the member 52 on the wheel side 41 in clamping engagement therewith, with the seat member 51 provided in the groove 46b and the elongated aperture 42b. The bolt 47 extending through the spacer 53 and the seat member 51 anchors the members 46 and 52 to the vehicle body 48 at the specified position. According to this embodiment, the energy absorbing piece 52 is formed at specified portions thereof with curved projections 52g having a saturated spring action which will act against the axial force of the bolt 47 when the piece 52 is fastened to the vehicle body by the bolt and the projections are thereby elastically deformed. Indicated at 54 is a spring washer, and at 55 a nut to be screwed on the bolt 47.

The planar portions 46a of the support member 46 and the energy absorbing member are clamped at their wheel side by the spacers 53, with the annular seat members 51 placed in the grooves 46b and elongated apertures 52b. The column 45 passed through the bent portion of the support member 46 is fastened to the specified portion of the vehicle body 48 with the bolts 47 extending through the spacers 53 and annular seat members 51. While the motor vehicle is being driven in the usual manner, the axial displacement of the steering column 45 prevented by the saturated spring characteristics of the curved projections 52g of the energy absorbing member against the axial force of the bolts 47 and by the rigidity inherent in the unloaded absorbing member.

When the primary impact resulting from the collision of the vehicle is delivered from the steering gear mechanism 44 toward the wheel 41, the lower shaft portion 43 and the tubular member 50 will be displaced toward the wheel 41, but the upper shaft portion 42 and the steering column 45 are prevented from moving toward the wheel 41 by the bolts 47 fastening the support member 46 to the vehicle body 48. Thus the present assembly prevents the wheel 41 from being forced upward by the primary impact.

When the breast of the driver strikes the wheel 41 upon the collision of the vehicle owing to the secondary impact thereof, the steering column 45 and the support member 46 will be subjected to the resulting impact acting toward the steering gear mechanism 44. As in the previous embodiments, however, this impact will be absorbed by the deformation of the energy absorbing member.

Stated more specifically, the energy absorbing member 52 and the support member 46 are held to the vehicle body 48 by the axial force of the bolts 47, and the annular seat members 51 engaging in the recesses 52e of the member 52 are anchored to the vehicle body 48 also by the axial force of the bolts 47 along with the U-shaped spacers 53. Accordingly the energy absorbing member 52, as supported at the recessed portions 52e, is stretched toward the steering gear mechanism 44, thus undergoing bending elastic deformation first and then plastic deformation. In the course of such deformation, the member 52 absorbs the energy of collision.

According to this invention, the static friction between the support member 46 and the spacers 53 is maintained, by the saturated spring characteristics of the curved projections 52g on the absorbing member 52, to a given level which will permit the displacement of the support member 46 and the steering column 45. Consequently when the wheel 41 is subjected to an impact force, acting toward the steering gear mechanism 44, which is greater than the sum of the static friction and the resistance to deformation of the weakest portions of the energy absorbing member 52, namely the zigzag portions $52c_n$ having the smallest width wn, the displacement of the support member 46 toward the gear mechanism 44 commences, starting to stretch the energy absorbing member 52 as supported by the annular seat members 51 and subjecting the zigzag portions $52c_n$ to elastic deformation first and then to plastic deformation. Simultaneously with this, the low friction portions, i.e. the joint between the steering column 45 and the tubular member 50 and the joint between the upper and lower shaft portions 42, 43 also start to collapse (displacement toward the steering gear mechanism).

Thus the energy absorbing member 52 starts to deform where it has the lowest rigidity. The progress of the deformation of the weakest portions from bending to tensile deformation gives rise to the bending deformation of the adjacent zigzag portions having larger width than the deformed portions. Such deformation develops from portion to portion, namely toward the portions having larger width and higher rigidity.

Since the energy absorbing member 52 comprises continuous zigzag portions $52c_1$, $52c_2$, ... $52c_n$ formed on the opposite sides of the elongated aperture 52b and including the bent portions 52f, the member 52 is deformable over a sufficient distance by all the zigzag portions being subjected to tensile deformation as will be apparent from FIG. 14. In the course of the deformation, the absorbing member therefore completely absorbs the secondary impact to protect the driver.

The bent portions 52f have a curvature sufficient to avoid stress concentration due to deformation, so that the zigzag portions are fully deformable free of stress concentration which would break the member.

When the weakest portions start to deform, the static friction between the support member 46 and the spacers 53, which has been maintained at a given level by the saturated spring characteristics of the curved projections 52g of the member 52, reduces to kinetic friction of smaller magnitude, and the deformation thereafter develops into portions of higher rigidity. Thus the absorbing member functions steadily when absorbing the energy.

As already described, the curved projections 52g formed in the energy absorbing member 52 exhibit saturated spring characteristics against the axial force P of bolts 47 when the steering column 45 is fastened to the vehicle body 48 with the bolts, thereby maintaining the static friction between the support member 46 and the spacers 53 at a definite level. The projections 52 also serve to adjust the axial force P of the bolts 47 in the presence of variations in the thickness $t_1$ of the member 52 as well as in the thickness $T_2$ of the planar portions 46a of the support member 46 relative to the thickness t of the annular seat members 51.

It is now assumed that the curved projections 52g are not formed in the energy absorbing member 52. If $t > (t_1 + t_2)$, the axial force P of the bolt 47 acts solely through the annular seat member 51, and clearances are formed between the spacer 53 and the absorbing member 52 and between the spacer 53 and the support member 46. With such clearances present, the vibration of the vehicle body would subject the steering wheel to vibration, and the driver would be unable to drive the vehicle.

On the other hand, if $t < (t_1 + t_2)$, the axial force P of the bolt 47 will act through the energy absorbing member 52 and the planar portion 46a of the support member 46, producing exceedingly high static friction between the support member 46 and the spacer 53 and rendering the absorbing member unable to absorb energy as desired in the event of a collision.

However, if the absorbing member 52 is formed with the curved projections 52g having a free height (the height before the member 52 is fastened by the bolt 47) equal to $t - (t_1 + t_2)$, there will be no clearance between the spacer 53 and the support member 46 or the energy absorbing member 52 when the parts are fastened to place by the bolt 47. The spring force of the projection 52g will then absorb vibration energy, if any, to render the steering wheel free of vibration.

Further if the free height of the projection is greater than $t - (t_1 + t_2)$, the projection 52g is elastically deformed by the bolt 47 when the member 52 is thereby fastened. The axial force P acts through the annular seat member 51, while the saturated spring action of the projection 52g due to its elastic deformation is provided between the support member 46 and the spacer 53, preventing an excessive axial force from acting therebetween and thereby maintaining the static friction therebetween at a definite level so as to afford ideal energy absorbing characteristics in the event of a collision.

Figure 15:
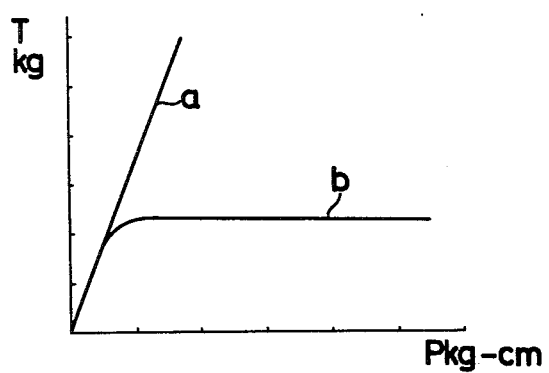
FIG. 15 is a diagram showing the characteristics of the embodiment.

FIG. 15 is a graph in which sliding load characteristics T (kg) is plotted as ordinate vs. fastening force P (kg-cm) of the bolt 47 as abscissa to show the relation therebetween (a) when the force P is allowed to act directly through the energy absorbing member 52 and member 46 ($t<(t_1+t_2)$), and (b) when the force P is caused to act through the annular seat member 51, with the static friction between the support member 46 and the spacer 53 maintained at a given level by the saturated spring characteristics of the curved projection 52g. The graph mainfestly reveals the effect achieved by the provision of the curved projection 52g. In the presence of the projection 52g, the sliding load characteristics remain at the same level despite the increase in the fastening force to exhibit a steady and improved energy absorbing performance. The embodiment having the projections is easy to make. Thus the present assembly has various outstanding advantages.

What is claimed is:

1. In a device for supporting on a vehicle body a steering column housing a steering shaft having a steering wheel at its upper end and connected to a steering gear at its lower end, a steering column support assembly having an energy absorbing function and comprising a support member secured to the steering column and having planar portions fastened to the vehicle body, and a frame-shaped energy absorbing member superposed on the planar portions of the support member and having at least one elongate deformation promoting aperture punched therein to form zigzag substantial portions in parallel to the axis of the column and subject to bending elastic deformation when absorbing energy, the absorbing member having one end secured to the planar portions of the support member and the other end having an inner edge positioned close to the steering wheel and defining the aperture and further including bolt means extending through the support member for fastening the support member to the vehicle body with said bolt means being positioned in contact with the inner edge.

2. A steering column support assembly as defined in claim 1 wherein the deformation promoting aperture permits the zigzag substantial portions to undergo bending elastic deformation first, then bending plastic deformation and thereafter tensile plastic deformation when absorbing energy.

3. A steering column support assembly as defined in claim 1 wherein each of the zigzag substantial portions of the energy absorbing member is formed with a weak portion.

4. A steering column support assembly as defined in claim 1 wherein each of the planar portions of the support member is formed with an elongated bolt groove having an open end on the steering wheel side thereof for passing the bolt means therethrough.

5. A steering column support assembly as defined in claim 1 wherein spacers are provided between the vehicle body and the energy absorbing member supported by the means extending through the support member.

6. A steering column support assembly as defined in claim 1 wherein spacers are provided between the vehicle body and the energy absorbing member supported by the bolt means.

7. A steering column support assembly as defined in claim 1 wherein the energy absorbing member and the support member are clamped by U-shaped spacers.

8. A steering column support assembly as defined in claim 1 wherein the portions of the energy absorbing member and of the support member facing the bolt means are provided with annular seat members supported by the bolt means.

9. A steering column support assembly as defined in claim 8 wherein each of the annular seat members is provided in a groove of the support member and in the aperture of the absorbing member to permit the axial fastening force of the bolt means to act therethrough.

10. A steering column support assembly as defined in claim 1 wherein the energy absorbing member is provided with means having saturated spring characteristics for exerting a given static frictional force on the support member against the axial fastening force of the bolt means on the vehicle body.

11. A steering column support assembly as defined in claim 10 wherein the means having saturated spring characteristics is in the form of a curved projection formed in the absorbing member so as to be elastically deformable by the axial fastening force of the bolt means.

12. A steering column support assembly as defined in claim 1 wherein the zigzag portions have a sufficient curvature so as not to be broken by stress concentration when the energy absorbing member is deformed.

13. A steering column support assembly as defined in claim 1 wherein the zigzag portions have a progressively varying width.

14. A steering column support assembly as defined in claim 1 wherein the zigzag portions have the smallest width on the steering gear side thereof and a progressively increasing width toward the steering wheel side thereof.

* * * * *